(12) United States Patent
Sasaki et al.

(10) Patent No.: US 10,033,234 B2
(45) Date of Patent: Jul. 24, 2018

(54) MOTOR

(71) Applicants: U-MHI PLATECH CO., LTD., Aichi (JP); MITSUBISHI HEAVY INDUSTRIES, LTD., Tokyo (JP)

(72) Inventors: Mikito Sasaki, Tokyo (JP); Shinichi Isobe, Tokyo (JP)

(73) Assignees: U-MHI PLATECH CO., LTD., Aichi (JP); MITSUBISHI HEAVY INDUSTRIES, LTD., Tokyo (JP)

( * ) Notice: Subject to any disclaimer, the term of this patent is extended or adjusted under 35 U.S.C. 154(b) by 259 days.

(21) Appl. No.: 15/037,325

(22) PCT Filed: May 7, 2014

(86) PCT No.: PCT/JP2014/062252
§ 371 (c)(1),
(2) Date: May 17, 2016

(87) PCT Pub. No.: WO2015/093074
PCT Pub. Date: Jun. 25, 2015

(65) Prior Publication Data
US 2016/0285327 A1 Sep. 29, 2016

(30) Foreign Application Priority Data
Dec. 20, 2013 (JP) ................. 2013-264304

(51) Int. Cl.
H02K 1/27 (2006.01)
H02K 1/24 (2006.01)
H02K 21/12 (2006.01)

(52) U.S. Cl.
CPC .......... *H02K 1/2706* (2013.01); *H02K 1/246* (2013.01); *H02K 1/2766* (2013.01); *H02K 21/12* (2013.01); *H02K 1/27* (2013.01)

(58) Field of Classification Search
CPC ..... H02K 1/2773; H02K 1/2766; H02K 1/276
(Continued)

(56) References Cited

U.S. PATENT DOCUMENTS 5,903,080 A * 5/1999 Nashiki ................. H02K 1/246
                                                        310/162
5,945,760 A * 8/1999 Honda ................... H02K 1/276
                                                        310/156.53
(Continued)

FOREIGN PATENT DOCUMENTS

CN 202142924 U 2/2012
CN 102761184 A 10/2012
(Continued)

OTHER PUBLICATIONS

International Search Report in PCT/JP2014/062252, dated Jul. 29, 2014.
Written Opinion in PCT/JP2014/062252, dated Jul. 29, 2014.

*Primary Examiner* — Burton Mullins
(74) *Attorney, Agent, or Firm* — Kanesaka Berner and Partners LLP

(57) ABSTRACT

A motor includes a stator that generates a rotating magnetic field; a rotor supported rotatably by a shaft within the stator; an outermost peripheral permanent magnet that is a permanent magnet embedded inside the rotor in an arced shape forming a convexity at the inner surface of the rotor; and an inner permanent magnet that is a permanent magnet embedded at the inside of the rotor in parallel to the outermost peripheral permanent magnet. The arc angle of the permanent magnets is greater than 90°, the thickness at the center of both inner permanent magnets is thinner than the thickness at the center of the outermost peripheral permanent magnet, and the thickness at the ends of both inner perma- (Continued)

nent magnets is thicker than the thickness at the ends of the outermost peripheral permanent magnet.

9 Claims, 6 Drawing Sheets

(58) Field of Classification Search
USPC .................................... 310/156.53, 156.56
See application file for complete search history.

(56) References Cited

U.S. PATENT DOCUMENTS

| | | | |
|---|---|---|---|
| 6,769,167 B2 * | 8/2004 | Lee .................... | H02K 1/246 |
| | | | 29/524.1 |
| 8,664,822 B2 * | 3/2014 | Vyas .................... | H02K 1/2766 |
| | | | 310/156.39 |
| 8,664,823 B2 * | 3/2014 | Vyas .................... | H02K 1/2766 |
| | | | 310/156.53 |
| 8,760,025 B2 * | 6/2014 | Rahman ............... | H02K 1/2766 |
| | | | 310/156.38 |
| 8,860,275 B2 * | 10/2014 | Kaiser .................. | H02K 1/2766 |
| | | | 310/156.53 |
| 8,917,005 B2 * | 12/2014 | Rahman ............... | H02K 1/2766 |
| | | | 310/156.53 |
| 8,928,197 B2 * | 1/2015 | Jurkovic .............. | H02K 1/2766 |
| | | | 310/156.38 |
| 9,118,230 B2 * | 8/2015 | Jurkovic .............. | H02K 1/2766 |
| 9,300,175 B2 * | 3/2016 | Shibata .................... | H02K 1/27 |
| 9,502,930 B2 * | 11/2016 | Huang ................... | H02K 1/246 |
| 9,515,526 B2 * | 12/2016 | Huang ................... | H02K 1/246 |
| 2013/0147302 A1 | 6/2013 | Rahman et al. | |
| 2013/0313936 A1 | 11/2013 | Shibata | |
| 2014/0167550 A1 * | 6/2014 | Huang ................. | H02K 1/2766 |
| | | | 310/156.19 |
| 2015/0171680 A1 * | 6/2015 | Kifuji .................. | H02K 1/2766 |
| | | | 310/156.43 |

FOREIGN PATENT DOCUMENTS

| | | |
|---|---|---|
| DE | 102012222438 A1 | 6/2013 |
| JP | 11-512918 A | 11/1999 |
| JP | 2003-259580 A | 9/2003 |
| JP | 2009-44893 A | 2/2009 |
| JP | 2011-83066 A | 4/2011 |
| JP | 2011-91911 A | 5/2011 |
| JP | 2013-247781 A | 12/2013 |
| JP | 2013-251948 A | 12/2013 |
| WO | 97/13311 A1 | 4/1997 |
| WO | 2013/187439 A1 | 12/2013 |

* cited by examiner

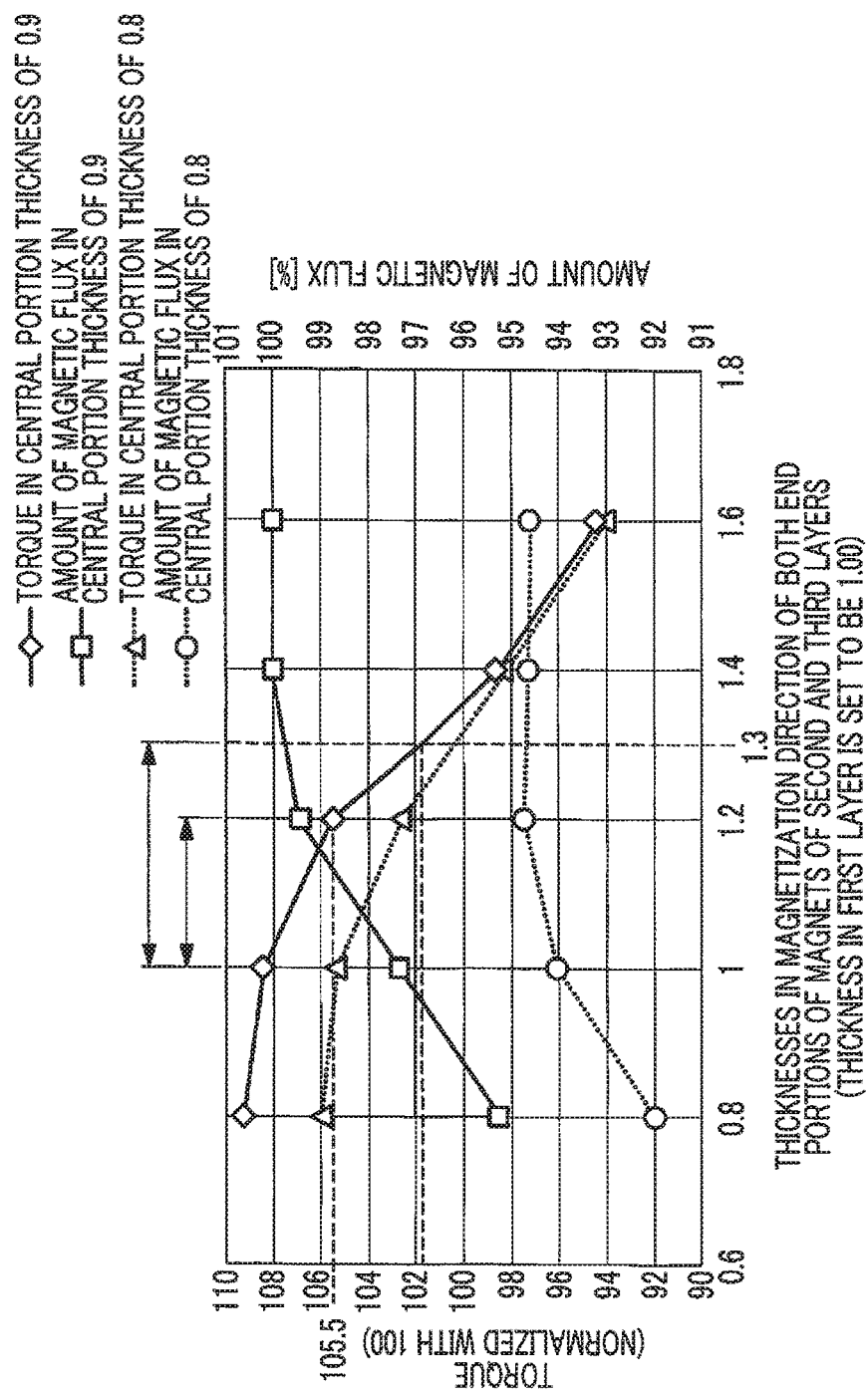

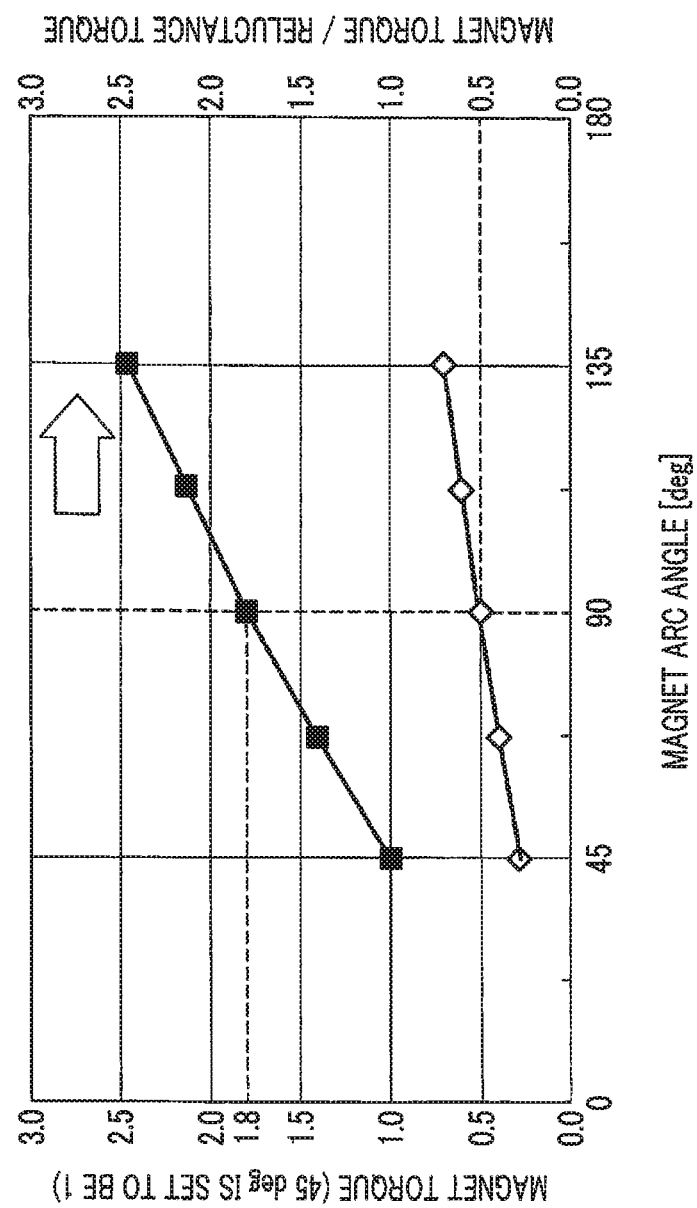

MOTOR

RELATED APPLICATIONS

The present application is a National Phase entry of International Application No. PCT/JP2014/062252, filed May 7, 2014, which claims priority of Japanese Application No. 2013-264304, filed Dec. 20, 2013.

TECHNICAL FIELD

The present invention relates to a motor and more specifically, is suitable for a synchronous reluctance motor using reluctance torque and magnet torque by embedding a permanent magnet in a rotor so as to have saliency.

BACKGROUND ART

A motor is a device which converts electrical energy to work (rotational energy). As a typical motor, there is a synchronous motor, in which a rotor is attracted to a stator by a rotating magnetic field which is generated by an alternating current which is applied to the stator, thereby rotating to follow the rotating magnetic field. In particular, a permanent magnet synchronous motor (a PM synchronous motor) has high efficiency, compared to an induction motor, an electromagnet synchronous motor, or the like.

In a motor which is used in industrial machinery or the like such as an injection molding machine, it is required to generate high torque. As the permanent magnet synchronous motor suitable for such a purpose, an interior permanent magnet synchronous motor (an IPM synchronous motor) is attracting attention. This is a motor in which a permanent magnet is not stuck to the surface of a rotor but is embedded in the rotor.

A torque formula of a permanent magnet motor is given by Expression (1).

$$T = p(Ld-Lq)IdIq + p\phi_0 Iq \quad (1)$$

p: number of poles of a motor
Ld, Lq: d-axis or q-axis inductance
Id, Iq: d-axis or q-axis current
$\phi_0$: magnet magnetic flux The first term of Expression (1) is reluctance torque which is generated by a difference in magnetoresistance, and the second term is magnet torque which is generated by a magnetic force of a magnet.

The magnet torque is torque which is generated by attraction and repulsion between a permanent magnet and a rotating magnetic field, and is generated by a permanent magnet embedded in a motor.

Further, the reluctance torque is torque which is generated by saliency in which magnetoresistance changes depending on the position of a rotor. An axis along a magnetic field of the rotor is set to be a d-axis and an axis electromagnetically orthogonal to the d-axis is set to be a q-axis.

In the IPM synchronous motor, the flow of a magnetic flux in a d-axis direction passes through a permanent magnet having small magnetic permeability, and therefore, electromagnetic resistance becomes greater, and thus the d-axis inductance Ld becomes greater. On the other hand, a q-axis direction is directed to a direction of a side surface portion of a permanent magnet, and therefore, the flow of a magnetic flux does not pass through the permanent magnet and passes through a magnetic body having large magnetic permeability. Therefore, electromagnetic resistance becomes smaller, and thus the q-axis inductance Lq becomes smaller. The reluctance torque is generated by a rotating magnetic field, based on the difference between these inductances. As is apparent from Expression (1), the greater the difference between the inductances, the greater the reluctance torque becomes.

CITATION LIST

Patent Literature

[PTL 1] Japanese Unexamined Patent Application Publication No. 2011-83066

SUMMARY OF INVENTION

Technical Problem

Incidentally, in the IPM synchronous motor, a reverse magnetic field is applied to the permanent magnet by the rotating magnetic field. The reverse magnetic field acts as a demagnetization field for the permanent magnet, and therefore, there is a case where the permanent magnet at a position where a strong demagnetization field acts is demagnetized if a coercive force is small.

Motor design is usually performed on the assumption that demagnetization does not occur. For this reason, if a motor is used in a state where demagnetization easily occurs, a possibility that the required performance may not be satisfied is high, and thus the reliability of a product is lowered. Further, in order to prevent this disadvantage, it is necessary to perform design by taking a margin (usually about 1%) in the amount of magnetic flux which is generated by the permanent magnet. However, if a demagnetizing factor is high, a necessity to take a large margin occurs, thereby incurring high cost. Further, if the demagnetizing factor is high, a decrease in magnetization is fast, and therefore, the life of a motor is shortened.

Due to these, high demagnetization resistance is required for a permanent magnet which is used in a motor.

In general, if a high-performance permanent magnet is used or the amount thereof is increased, it is possible to design a motor having high torque and high demagnetization resistance. However, a problem such as an increase in cost or an increase in the volume and mass of a product arises.

Therefore, for example, in PTL 1, for prevention of the demagnetization of an arc-shaped permanent magnet having a multilayer structure, an increase in demagnetization resistance is realized while thickening the thicknesses of two magnets on the rotor outside, out of permanent magnets having an arc angle of less than or equal to 90°.

However, in this case, since the arc angle is less than or equal to 90°, magnet torque becomes smaller, and thus there is a problem in that the total torque decrease.

The present invention has an object to provide a compact motor which generates high torque without the occurrence of demagnetization and can be realized at low cost.

Solution to Problem

According to a first aspect of the present invention, there is provided a motor including: a stator which generates a rotating magnetic field; a rotor rotatably supported by a shaft inside the stator; an outermost peripheral permanent magnet which is a permanent magnet embedded in the rotor in an arc shape convex to the inside of the rotor; and inner permanent magnets which are permanent magnets embedded in an arc shape convex to the inside of the rotor, on the outermost peripheral permanent magnet side in the rotor, in which thicknesses of central portions of both the inner permanent magnets are thinner than a thickness of a central portion of the outermost peripheral permanent magnet, and thicknesses of end portions of both the inner permanent magnets are thicker than a thickness of an end portion of the outermost peripheral permanent magnet.

According to this configuration, it is possible to increase a d-axis magnetic flux which passes between the permanent magnets, by thickening a magnetic body between the permanent magnets by making the thicknesses of the central portions of the inner permanent magnets thinner than that of the outermost peripheral permanent magnet. Further, there is a possibility that demagnetization may occur due to bringing the end portions of the inner permanent magnets close to the outer periphery side of the rotor. However, an increase in demagnetization resistance is attained by making the thicknesses of the end portions of the inner permanent magnets thicker than that of the outermost peripheral permanent magnet.

In this way, a motor having high torque and high demagnetization resistance can be realized without greatly increasing the amount of magnet.

In the first aspect of the present invention, a curvature of a central portion of an arc of a wall of an innermost peripheral inner permanent magnet closest to the shaft, out of the inner permanent magnets, the wall facing the outside of the rotor, may be smaller than a curvature of a central portion of an arc of a wall of the outermost peripheral permanent magnet or the inner permanent magnet, the wall facing the inside of the rotor, disposed further toward the rotor outside than the innermost peripheral inner permanent magnet.

In the first aspect of the present invention, an arc of a central portion of the wall of the innermost peripheral inner permanent magnet, the wall facing the inside of the rotor, may be substantially parallel to an arc of a central portion of a wall of the outermost peripheral permanent magnet or the inner permanent magnet, the wall facing the outside of the rotor, disposed further toward the rotor outside than the innermost peripheral inner permanent magnet.

According to this configuration, the central portion of the permanent magnet is made to be thin and the end portion is made to be thick. Therefore, in a case where the distances between the end portions of the permanent magnets are the same, it is possible to increase the area of a central portion of a magnetic body between the permanent magnet disposed at the innermost periphery and the permanent magnet disposed next to the above permanent magnet. For this reason, more d-axis magnetic flux can be induced in the central portion of the magnetic body in a limited space. In the d-axis magnetic flux closer to the shaft of the rotor, the number thereof affects reluctance torque, and therefore, torque is significantly improved by increasing the area of the central portion of the magnetic body closest to the shaft.

In the first aspect of the present invention, an arc angle of each of the outermost peripheral permanent magnet and the inner permanent magnets may be greater than 90°.

According to this configuration, the arc angle of each of the permanent magnets embedded in the rotor is set to be greater than 90°, and therefore, it is possible to bring both ends of the magnet close to the outer periphery side, and thus it is possible to increase magnet torque. However, at that time, the magnetic flux (the d-axis magnetic flux) which passes between the permanent magnets decreases, and thus there is a possibility that the reluctance torque may decrease due to a decrease in d-axis inductance. For this reason, the d-axis magnetic flux which passes between the permanent magnets is increased by thickening the magnetic body between the permanent magnets by making the thicknesses of the central portions of the inner permanent magnets thinner than that of the outermost peripheral permanent magnet. Further, there is a possibility that demagnetization may occur due to bringing the end portions of the inner permanent magnets close to the outer periphery side of the rotor. However, an increase in demagnetization resistance is attained by making the thicknesses of the end portions of the inner permanent magnets thicker than that of the outermost peripheral permanent magnet.

In this way, a motor having high torque and high demagnetization resistance can be realized without greatly increasing the amount of magnet.

In the first aspect of the present invention, the thickness of the central portions of each of the inner permanent magnets may be greater than or equal to 0.75 times the thickness of the central portion of the outermost peripheral permanent magnet.

According to this configuration, as long as a magnetic flux is not saturated, the more the area of the magnetic body between the permanent magnets increases, the more the d-axis magnetic flux which passes therethrough increases, and thus the reluctance torque increases. However, at the same time, the volume of the permanent magnet is reduced, and therefore, a magnetic force is lowered and the magnet torque decreases.

According to this configuration, it is possible to realize the maximum torque among these exclusive events.

In the first aspect of the present invention, the thickness of the end portions of each of the inner permanent magnets may be less than or equal to 1.3 times the thickness of the end portion of the outermost peripheral permanent magnet.

In the first aspect of the present invention, the thickness of the end portions of each of the inner permanent magnets may be greater than or equal to 1.2 times the thickness of the end portion of the outermost peripheral permanent magnet.

In order to increase the demagnetization resistance of the permanent magnet, it is desirable to thicken the end portion. However, if the end portion is too thick, the d-axis magnetic flux which can pass between the permanent magnets is reduced, and the reluctance torque is reduced with a certain value as a boundary.

According to this configuration, it is possible to realize a motor having high demagnetization resistance, without greatly lowering the generated torque among these exclusive events.

In the first aspect of the present invention, the outermost peripheral permanent magnet or the inner permanent magnets may be divided in a circumferential direction of the rotor.

According to this configuration, the mass per one magnet can be reduced, and thus centrifugal stress acting on a rotor core can be reduced.

Further, the thickness of the rotor is left without being cut out at the central portion of the magnet, whereby the expansion of a slit due to the permanent magnet which has received a centrifugal force is suppression, and thus it is possible to prevent deformation.

In the first aspect of the present invention, the inner permanent magnets may be two layers.

In order to secure a plurality of passing paths for the d-axis magnetic flux, it is preferable that the permanent magnets are three or more layers in total. However, if the permanent magnets are four or more layers, the magnet becomes thinner, and thus the magnet torque becomes smaller, whereby there is a concern that large torque may not be generated. This configuration has two layers of inner permanent magnets and has three layers along with the outermost peripheral permanent magnet, whereby it is possible to generate large torque in a limited space.

Advantageous Effects of Invention

According to the present invention, magnet torque is increased without greatly increasing the amount of permanent magnet, and reluctance torque is increased by increasing the d-axis magnetic flux which passes through a magnetic body. Therefore, the demagnetization resistance is improved. By these, a motor having high torque and high demagnetization resistance can be realized at a low price.

BRIEF DESCRIPTION OF DRAWINGS

FIG. 5 is a graph showing changes in torque and the amount of magnetic flux when changing the thicknesses in a magnetization direction of both end portions of the magnets of the second and third layers in the rotor according to the embodiment of the present invention.

FIG. 6 is a graph showing a correlation between an arc angle of a permanent magnet, magnet torque, and magnet torque/reluctance torque in the rotor according to the embodiment of the present invention.

DESCRIPTION OF EMBODIMENTS

Hereinafter, a motor 1 according to an embodiment of the present invention will be described using FIGS. 1 and 2.

Figure 1:
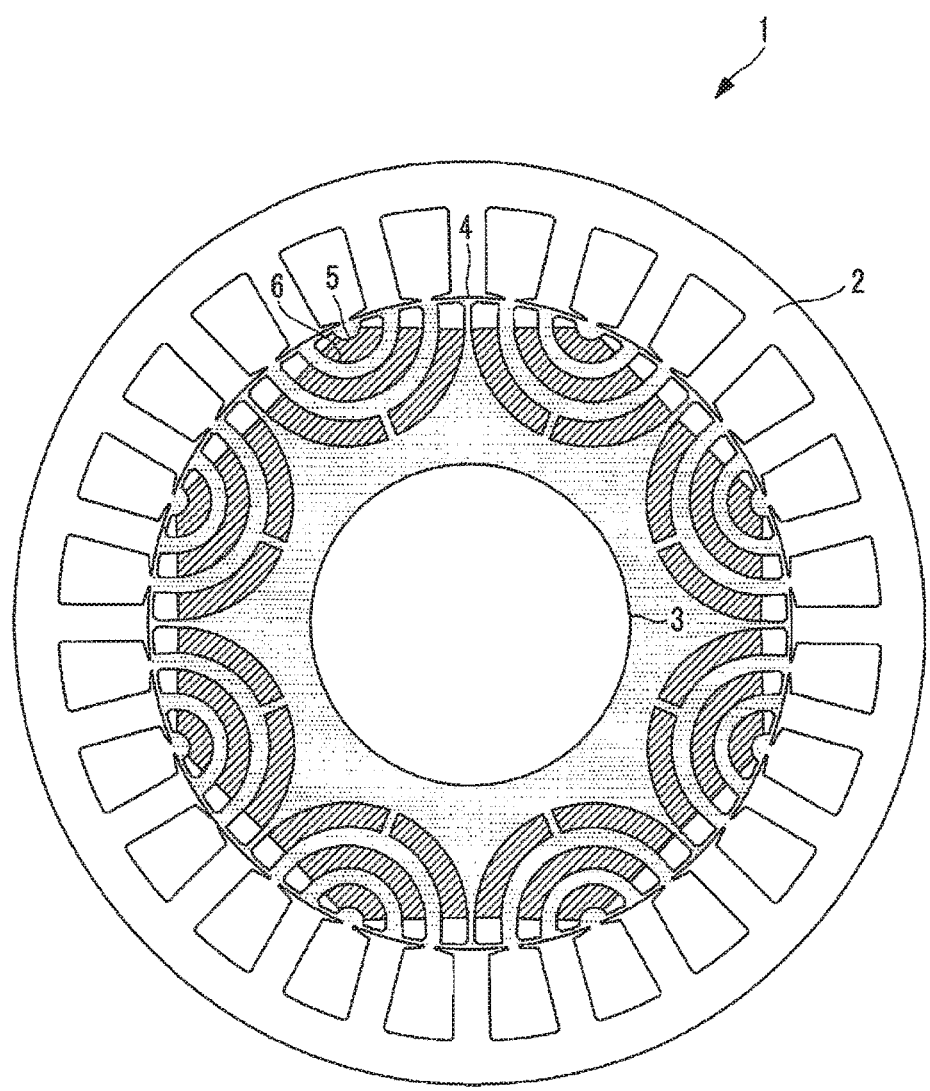
FIG. 1 is a cross-sectional view showing a rotor according to an embodiment of the present invention.

As shown in FIG. 1, the motor 1 according to this embodiment is provided with a stator 2 around which a winding wire is wound and which can generate a rotating magnetic field in a central portion by an alternating current, a cylindrical rotor 4 supported so as to be able to rotate about a shaft 3 inside the stator 2, and twenty-four permanent magnets 5 embedded in the rotor 4. The permanent magnets 5 includes an outermost peripheral permanent magnet 5a and inner permanent magnets 5b and 5c, and in particular, the inner permanent magnet 5c is an innermost peripheral inner permanent magnet 5c.

In this embodiment, the rotor 4 which serves as a magnetic body is made of iron, and all the permanent magnets 5 are ferrite magnets. However this is not essential. In particular, as the permanent magnet 5, a neodymium magnet may be used, and although it is not limited to this embodiment, this embodiment is for increasing magnet torque by bringing both ends of a magnet close to the outer periphery side, and therefore, a high-performance ferrite magnet or neodymium magnet having high residual magnetic flux density and a very strong magnetic force is suitable.

Three arc-shaped slits 6a, 6b, and 6c are provided in the rotor 4, and the permanent magnets 5a, 5b, and 5c are embedded one by one in the slits 6a, 6b, and 6c. The three slits 6 and the three permanent magnets 5 are provided in eight sets in a single rotor 4. Hereinafter, one set of these will be described using FIG. 2.

The slit 6 is formed in an arc shape which is convex to the inside of the rotor 4 (hereinafter referred to as a "rotor inside", and the same also applies to the outside). In other words, the distance between a center line of the slit 6 and a shaft center of the shaft 3 is the shortest at a central portion M of the slit 6 and becomes longer as it goes to an end.

Further, both ends of the slit 6 are in close proximity to the outer periphery of the rotor 4 (hereinafter referred to as a "rotor outer periphery", and the same also applies to the inner periphery), and the slit 6a is provided outside of the slit 6b on the rotor, and the slit 6b is provided outside of the slit 6c on the rotor. The slits 6 do not intersect one another.

The width of the permanent magnet 5 is substantially the same as the width of the slit 6, and therefore, the permanent magnet 5 and the slit 6 have substantially the same shape. However, the length of the slit 6 is longer. The permanent magnet 5 is embedded substantially in the center of the slit 6. The outermost peripheral permanent magnet 5a is embedded in the slit 6a, the inner permanent magnet 5b is embedded in the slit 6b, and the innermost peripheral inner permanent magnet 5c is embedded in the slit 6c. However, only the innermost peripheral inner permanent magnet 5c is divided in a circumferential direction at the central portion M, and the slit 6c is also divided accordingly.

Due to such a structure, the outermost peripheral permanent magnet 5a is a permanent magnet which is located at the outermost periphery of the rotor 4, and the innermost peripheral inner permanent magnet 5c is a permanent magnet which is located at the innermost periphery of the rotor 4. Further, the central portion M of the innermost peripheral inner permanent magnet 5c is closest to the shaft 3.

All the magnetic poles of the permanent magnets 5a, 5b, and 5c are buried so as to be in the same direction in a radial direction of the rotor 4. However, the magnetic poles of the permanent magnets adjacent to each other in a circumferential direction of the rotor 4 are buried so as to be in different directions in the radial direction of the rotor 4.

An arc angle θ of each of the permanent magnets 5a, 5b, and 5c is greater than 90° and is set to be 135° in this embodiment.

In other words, an arc angle θ which is open toward the permanent magnets 5a, 5b, and 5c, out of angles formed by a regression line A1 at end portions E on one side of the permanent magnets 5a, 5b, and 5c and a regression line A2 at end portions E on the other side, is greater than 90°.

The widths of the central portions M of the inner permanent magnet 5b and the innermost peripheral inner permanent magnet 5c are thinner than the width of the central portion M of the outermost peripheral permanent magnet 5a. For this reason, the thickness of a magnetic body between the permanent magnets 5 becomes thicker.

In particular, in this embodiment, the widths of the central portions M of the inner permanent magnets 5b and 5c are 0.9 times the width of the central portion M of the outermost peripheral permanent magnet 5a.

The widths of the end portions E of the inner permanent magnets 5b and 5c are thicker than the width of the end portion E of the outermost peripheral permanent magnet 5a.

In particular, in this embodiment, the widths of the end portions E of the inner permanent magnets 5b and 5c are 1.2 times the width of the end portion E of the outermost peripheral permanent magnet 5a.

The central portion M of an arc which is formed by a wall O of the innermost peripheral inner permanent magnet 5c, the wall facing the outside of the rotor, is formed such that the curvature thereof is smaller than that of the central portion M of an arc which is formed by a wall O of the inner permanent magnet 5b, the wall facing the outside of the rotor.

Further, the width between an arc which is formed by a wall I of the innermost peripheral inner permanent magnet 5c, the wall facing the inside of the rotor, and the arc which is formed by the wall O of the inner permanent magnet 5b is substantially constant, the wall facing the outside of the rotor.

Further, each of the rotor 4, the permanent magnets 5, and the slits 6 has substantially the same thickness along an axial direction. The slits 6 extend through the rotor 4.

Further, the permanent magnets 5 may be divided in the circumferential direction of the rotor. In this embodiment, a structure in which only the innermost peripheral inner permanent magnet 5c is divided at the central portion M is adopted.

In the innermost peripheral inner permanent magnet 5c having the largest mass, among the three magnets, in a case where the innermost peripheral inner permanent magnet 5c is not divided in the circumferential direction, centrifugal stress which is generated when the motor 1 rotates becomes greater. Due to the centrifugal force, there is a concern that the slit 6c which receives the mass of the innermost peripheral inner permanent magnet 5c may be expanded and deformed in the radial direction.

Therefore, a structure in which the thickness of the rotor 4 is left without being cut out at the central portion M by dividing the innermost peripheral inner permanent magnet 5c and the slit 6c is adopted. In this way, when the slit 6c is expanded in the radial direction due to the centrifugal force of the innermost peripheral inner permanent magnet 5c, the expansion and deformation of the slit 6 can be prevented by a connection portion between cores of the rotor 4 in the radial direction in the central portion M, and thus it is possible to improve the strength performance of a rotor core.

Next, an operation and effects of this embodiment will be described.

A torque formula of a permanent magnet motor is given by Expression (1).

$$T = p(Ld - Lq)IdIq + p\phi_0 Iq \quad (1)$$

p: number of pole pairs of a motor
Ld, Lq: d-axis or q-axis inductance
Id, Iq: d-axis or q-axis current
$\phi_0$: magnet magnetic flux The first term of Expression (1) is reluctance torque which is generated by a difference in magnetoresistance, and the second term is magnet torque which is generated by a magnetic force of the permanent magnet 5.

The magnet torque is torque which is generated by attraction and repulsion between the permanent magnet 5 and a rotating magnetic field, and is generated by the permanent magnet 5 embedded in the motor 1.

Further, the reluctance torque is torque which is generated from the rotating magnetic field by a difference between magnetoresistances in a d-axis which is an axis along a magnetic field that the rotor 4 having saliency makes, and a q-axis electromagnetically orthogonal to the d-axis.

In an IPM synchronous motor, the flow of a magnetic flux in a d-axis direction passes through the permanent magnet 5 having small magnetic permeability, and therefore, electromagnetic resistance becomes greater, and thus the d-axis inductance Ld becomes greater. On the other hand, a q-axis direction is directed to a direction of a side surface portion of the permanent magnet 5, and thus the flow of a magnetic flux does not pass through the permanent magnet 5 and passes through only a magnetic body having large magnetic permeability. Therefore, electromagnetic resistance becomes smaller, and thus the q-axis inductance Lq becomes smaller. The reluctance torque is generated by the rotating magnetic field, based on the difference between these inductances. As is apparent from Expression (1), the greater the difference between the inductances, the greater the reluctance torque becomes.

If an alternating current flows to the stator 2, a rotating magnetic field is generated in a central portion of the stator 2. The magnet torque is generated by attraction and repulsion between the rotating magnetic field and a magnetic field which is generated by the permanent magnet 5.

It is preferable that the arc angle θ of the permanent magnet 5 is set to be greater than or equal to 90°. In this case, the end portions E on both sides of the permanent magnet 5 come close to the outer periphery side of the rotor 4, and therefore, the magnet magnetic flux $\phi_0$ is effectively used, compared to a case of the arc angle θ being less than or equal to 90°, and thus the magnet torque corresponding to the second term of Expression (1) increases. As shown in FIG. 6, the magnet torque increases in proportion to the arc angle of the permanent magnet 5.

Incidentally, in general, the value of the ratio of magnet torque/reluctance torque is set to be greater than or equal to 0.5. This is because if the value of the ratio of magnet torque/reluctance torque is smaller than 0.5, vibration and noise of the motor 1 increase due to a reluctance torque and cannot be permitted in terms of strength and a use environment. In this embodiment, the arc angle θ of the permanent magnet 5 is set to be greater than or equal to 90°, whereby the value of the ratio of magnet torque/reluctance torque becomes greater than or equal to 0.5, and thus it is possible to suppress vibration and noise of the motor 1. Further, in a case where the arc angle θ is set to be greater than or equal to 90°, it is possible to make the magnet torque greater than or equal to 1.8 times the magnet torque with a magnet arc angle of 45 degrees in which the areas of the permanent magnet 5 and air becomes about 1:1 in the slit 6.

Further, by taking the above configuration, a magnetic flux by the rotating magnetic field passes between the permanent magnets 5. Inductance is expressed as the ratio between a magnetic flux and a current, and therefore, in the same current, the inductance Lq is determined by the number of magnetic fluxes (d-axis magnetic fluxes 7). The d-axis magnetic flux 7 is a magnetic flux in a direction parallel to the permanent magnet 5, as shown in FIG. 2. For this reason, if the d-axis magnetic flux 7 increases, Lq increases, and thus inductance torque increases from Expression (1). The stronger the magnetic field which is applied, the further the d-axis magnetic flux 7 increases. However, only a determined number can pass in a constant area, and therefore, after magnetic flux density is saturated, the greater the passable area, the further the d-axis magnetic flux 7 increases.

In normal use of the motor 1, the d-axis magnetic flux 7 is saturated, and therefore, the greater the area in which a magnetic flux can pass, the further the reluctance torque increases.

In this embodiment, the thickness of the magnetic body between the permanent magnets 5 is made to be thick, and therefore, the area in which a magnetic flux can pass increases, and thus the d-axis magnetic flux 7 and Lq increase, and as a result, the reluctance torque corresponding to the first term of Expression (1) increases.

However, if the thickness of the magnetic body is too thick, the amount of permanent magnet is reduced, and therefore, the magnet torque is reduced, and thus there is a concern that the total toque may be reduced.

Figure 4:
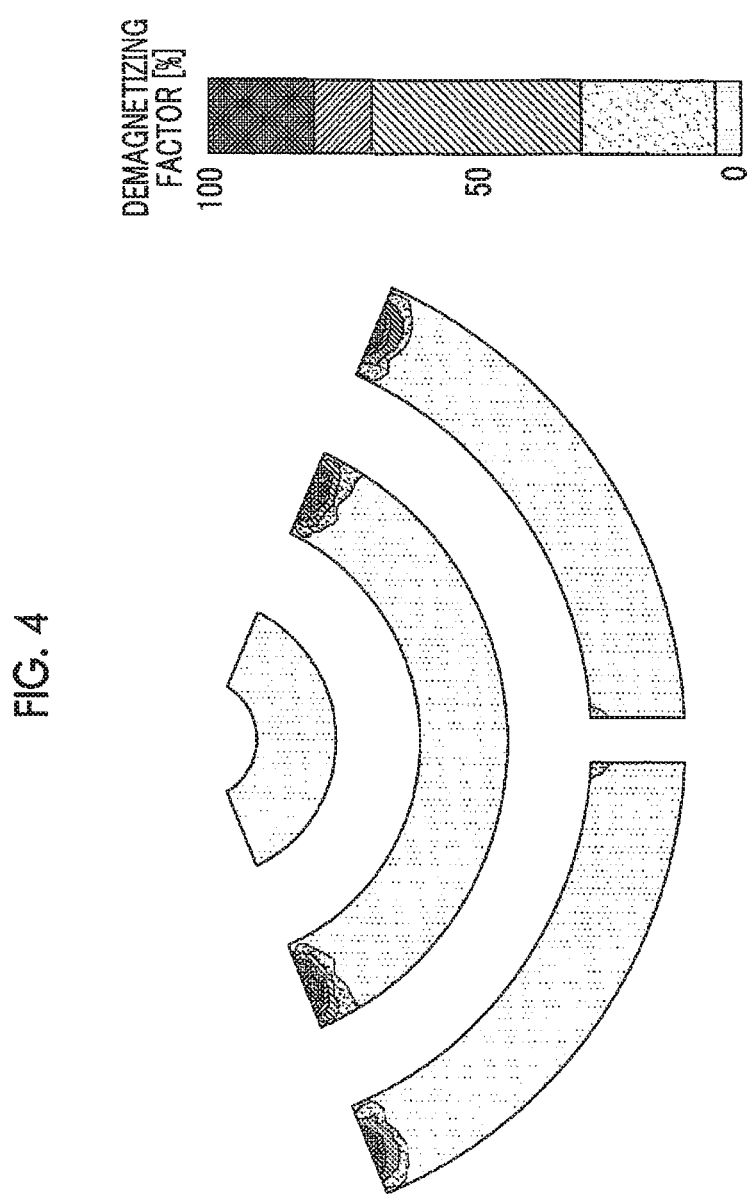
FIG. 4 is the result of an analysis for a demagnetizing factor which is generated when a magnetic field is generated in the rotor according to the embodiment of the present invention.

Therefore, the result of an actual analysis of torque in a case where a magnet thickness is changed is FIG. 4. The analysis was performed by finite element method analysis software JMAG (manufactured by JSOL Corporation).

Figure 3:
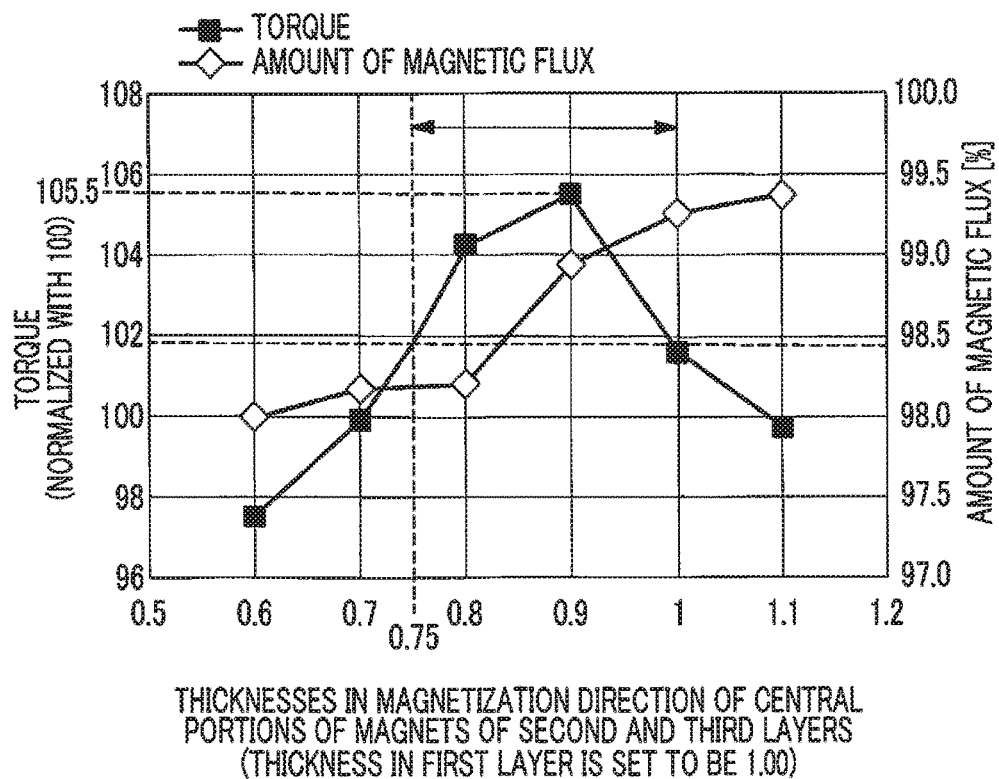
FIG. 3 is a graph showing changes in torque and the amount of magnetic flux when changing the thicknesses in a magnetization direction of central portions of magnets of second and third layers in the rotor according to the embodiment of the present invention.

FIG. 3 shows changes in torque when the thicknesses in the central portions M of the inner permanent magnets 5b and 5c are uniformly changed and the amount of magnetic flux when a rotating magnetic field is applied. With respect to the thicknesses, the thickness of the first layer is set to be 1.00, and with respect to the torque, a certain value is normalized with 100, and with respect to the amount of magnetic flux, the amount of magnetic flux before a diamagnetic field is applied is set to be 100% (demagnetizing factor: 0%).

As can be seen from FIG. 3, when the magnet central portion dimensions of the inner permanent magnets 5b and 5c are greater than or equal to 0.75 times and less than 1 times that of the outermost peripheral permanent magnet 5a, the torque becomes greater, compared to cases of being greater than or equal to 1 times and being less than 0.75 times. This shows that compared to a case where the thickness of a permanent magnet which is generally used in the related art is set to be uniform, the torque can be maximized by making the magnet central portion dimensions of the inner permanent magnets 5b and 5c greater than or equal to 0.75 times and less than 1 times that of the outermost peripheral permanent magnet 5a, according to this embodiment. Accordingly, in this embodiment, with respect to the magnet central portion dimensions of the inner permanent magnets 5b and 5c, it can be said that the value of greater than or equal to 0.75 times and less than 1 times that of the outermost peripheral permanent magnet 5a is the optimal value. Further, when the value is 0.9 times, the torque has the maximum value (about 105.5), and therefore, in this embodiment, 0.9 times is adopted.

Further, the result of an examination for the demagnetizing factor which is generated at this time is FIG. 4. The analysis was performed by finite element method analysis software JMAG (made by JSOL Corporation). As can be seen from FIG. 4, significant demagnetization was generated at both ends of the inner permanent magnets 5b and 5c. This is because as a result of making the arc angle θ large, both ends of the magnets come close to the stator 2, and thus a strong reverse magnetic field is applied.

In this embodiment, this is solved by making the widths of the end portions E of the inner permanent magnets 5b and 5c thicker than the width of the end portion E of the outermost peripheral permanent magnet 5a.

However, if the widths are too thick, a magnetic flux path is narrowed, and thus the amount of d-axis magnetic flux 7 which passes between the permanent magnets 5 is reduced, and therefore, there is a concern that the reluctance torque may be reduced.

Therefore, the result of a specific examination for an optimal end portion thickness is FIG. 5. The analysis was performed by finite element method analysis software JMAG (made by JSOL Corporation). Torque in a case where only the thickness of the end portion E is changed while the thickness of the central portion M is set to be 0.9 times that of the outermost peripheral permanent magnet (a case of being 0.8 times is also described as a reference) is analyzed.

As is apparent from FIG. 5, when the magnet end portion dimensions of the inner permanent magnets 5b and 5c are less than or equal to 1.3 times that of the outermost peripheral permanent magnet 5a, the torque exceeds torque in a case where both the center and the end portion are the same as those of the outermost peripheral permanent magnet 5a, that is, a torque value, about 102, in a case of using a permanent magnet having a uniform thickness which is a conventional technique shown in the description of FIG. 3.

Further, when the magnet end portion dimensions of the inner permanent magnets 5b and 5c are less than or equal to 1.2 times that of the outermost peripheral permanent magnet 5a, the rate of decrease of torque is relatively gentle, compared to a case of being greater than or equal to 1.2 times.

Further, the torque exceeds the maximum torque (about 105.5) in a case where both the center and the end portion are 0.9 times that of the outermost peripheral permanent magnet 5a.

In this embodiment, 1.2 times in which it is possible to generate relatively large torque, out of a range in which the amount of magnetic flux is greater than or equal to 99% (the demagnetizing factor is less than or equal to 1%) and the torque exceeds that in a case where both the center and the end portion are the same as the those of the outermost peripheral permanent magnet 5a (that is, about 102 which is torque in a case of using a permanent magnet having a uniform thickness of a conventional technique), that is, a range in which the magnet end portion dimensions of the inner permanent magnets 5b and 5c are greater than or equal to 1.2 times and less than or equal to 1.3 times that of the outermost peripheral permanent magnet 5a, is adopted. In this way, the magnet end portion dimensions of the inner permanent magnets 5b and 5c by this embodiment can be made to be the optimal value with respect to the dimension of the outermost peripheral permanent magnet 5a and the motor 1 by this embodiment can obtain motor torque exceeding that of a motor by a conventional method.

Further, in this embodiment, the central portion M of the arc which is formed by the wall O on the rotor outside of the innermost peripheral inner permanent magnet 5c is formed such that the curvature thereof is smaller than that of the central portion M of the arc which is formed by the wall O on the rotor outside of the inner permanent magnet 5b.

Specifically, the arc which is formed by the central portion M of the wall I on the rotor inside of the innermost peripheral inner permanent magnet 5c and the arc which is formed by the central portion M of the wall O on the rotor outside of the inner permanent magnet 5b have the same curvature, thereby being substantially parallel to each other. In this state, the central portions M of the inner permanent magnets 5b and 5c are made to be thin and the end portions E are made to be thick.

Figure 2:
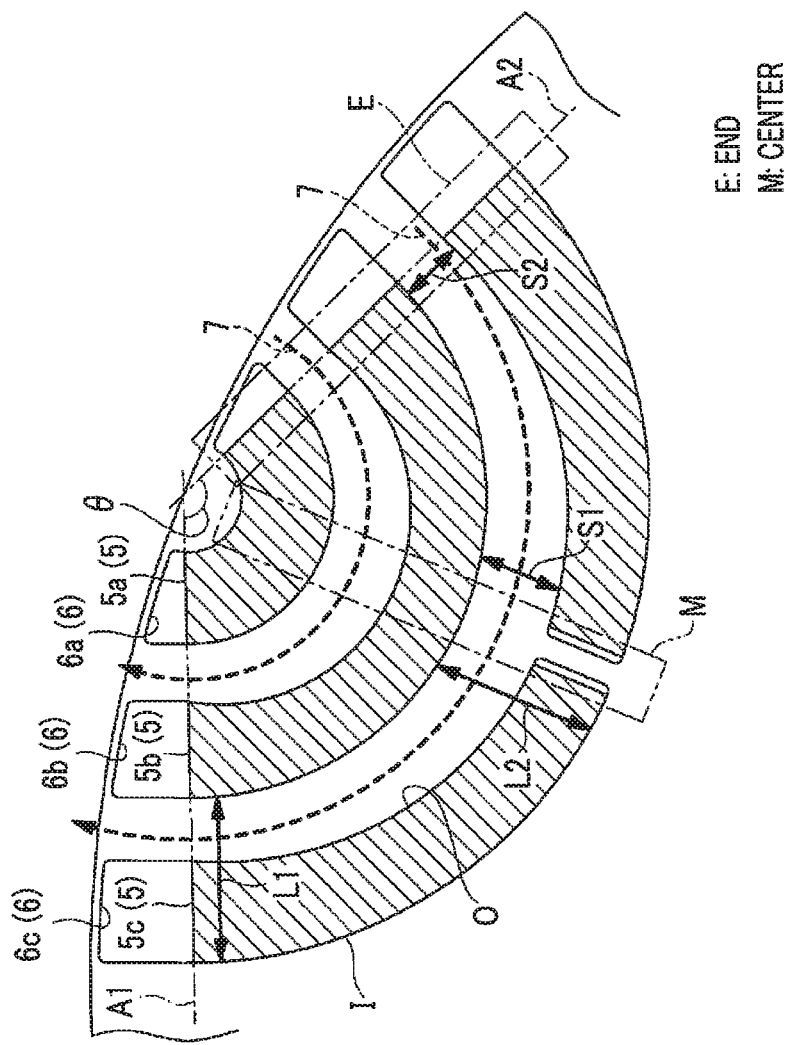
FIG. 2 is a portion of a partial cross-sectional view showing the rotor according to the embodiment of the present invention.

In other words, in FIG. 2, the permanent magnets 5b and 5c are formed such that the lengths of a distance between outer wall surfaces of the end portions L1 and a distance between outer wall surfaces of the central portions L2 are the same, the curvatures are also the same, and a distance between opposed wall surfaces of the end portions S2 is shorter than a distance between opposed wall surfaces of the central portions S1.

As a result, the central portion M of the arc which is formed by the wall O on the rotor outside of the innermost peripheral inner permanent magnet 5c is formed such that the curvature thereof is smaller than that of the central portion M of the arc which is formed by the wall O on the rotor outside of the inner permanent magnet 5*b*. Further, in both the inner permanent magnets 5*b* and 5*c*, the curvatures of the walls O facing the rotor outside become smaller than those of the walls I facing the rotor inside.

In this way, in a case where the distances between the end portions E of the inner permanent magnets 5*b* and 5*c* are the same, the magnet thickness of the central portion M having a low demagnetizing factor, compared to a case where the magnitude of a curvature is reverse, becomes thinner and the distance between the central portions M of the inner permanent magnets 5*b* and 5*c* becomes greater. Accordingly, a magnetic flux path (a magnetic path) is widely taken in a limited space, and thus the magnetic path of the d-axis magnetic flux 7 is widened. Therefore, high torque can be realized.

According to the above-described embodiment, high torque is realized without greatly increasing the amount or quality of a magnet, by making the arc angle θ of the permanent magnet 5 greater than 90° and making the thicknesses of the central portions M of the inner permanent magnets 5*b* and 5*c* thinner than the thickness of the central portion M of the outermost peripheral permanent magnet 5*a*.

Further, demagnetization resistance is improved by making the thicknesses of the end portions E of the inner permanent magnets 5*b* and 5*c* thicker than the thickness of the end portion E of the outermost peripheral permanent magnet 5*a*.

Further, the central portion M of the arc which is formed by the wall O on the rotor outside of the innermost peripheral inner permanent magnet 5*c* is formed such that the curvature thereof is smaller than that of the central portion M of the arc which is formed by the wall O on the rotor outside of the inner permanent magnet 5*b*, or the width between the arc which is formed by the wall I on the rotor inside of the innermost peripheral inner permanent magnet 5*c* and the arc which is formed by the wall O on the rotor outside of the inner permanent magnet 5*b* is made to be substantially constant, whereby with a compact structure, the area of the central portion M of the magnetic body between the permanent magnets is made to be greater and the area of the end portion E is made to be smaller.

Further, the optimal dimensions in which demagnetization resistance is high and torque is large are determined from the analysis results.

By these, a compact motor 1 is realized which generates high torque without the occurrence of demagnetization and can be realized at low cost.

In addition, in this embodiment, three slits 6 and three permanent magnets 5 are provided in eight sets. However, there is no limitation thereto.

For example, four slits 6 and four permanent magnets 5, or two slits 6 and two permanent magnets 5 may be provided, and instead of eight sets, six sets, ten sets, or the like is also conceivable.

However, in four or more slits 6 and four or more permanent magnets 5, the permanent magnets become thinner, and thus the magnet torque becomes smaller, whereby there is a possibility that the necessary magnetic force may not be created. Further, in two slits 6 and two permanent magnets 5, a passing path of the d-axis magnetic flux 7 is not sufficient, and the reluctance torque becomes smaller, whereby there is a possibility that the necessary magnetic force may not be created. For this reason, three slits 6 and three permanent magnets 5 are preferable.

Further, in this embodiment, the width of the permanent magnet 5*a* is made to be substantially constant. However, there is no limitation thereto.

REFERENCE SIGNS LIST

1: motor
2: stator
3: shaft
4: rotor
5, 5*a*, 5*b*, 5*c*: permanent magnet
5*a*: outermost peripheral permanent magnet
5*b*, 5*c*: inner permanent magnet
5*c*: innermost peripheral inner permanent magnet
6, 6*a*, 6*b*, 6*c*: slit
7: d-axis magnetic flux
θ: arc angle
O: wall on the rotor outside
I: wall on the rotor inside
A1, A2: regression line
M: central portion
E: end portion
L1: distance between outer wall surfaces of end portions
L2: distance between outer wall surfaces of central portions
S1: distance between opposed wall surfaces of central portions
S2: distance between opposed wall surfaces of end portions

The invention claimed is:

1. A motor comprising:
a stator which generates a rotating magnetic field;
a rotor rotatably supported by a shaft inside the stator;
an outermost peripheral permanent magnet which is a permanent magnet embedded in the rotor in an arc shape convex to the inside of the rotor; and
inner permanent magnets which are permanent magnets embedded in an arc shape convex to the inside of the rotor, on the outermost peripheral permanent magnet side in the rotor,
wherein thicknesses of central portions of both the inner permanent magnets are thinner than a thickness of a central portion of the outermost peripheral permanent magnet, and
thicknesses of end portions of both the inner permanent magnets are thicker than a thickness of an end portion of the outermost peripheral permanent magnet.

2. The motor according to claim 1, wherein a curvature of a central portion of an arc of a wall of an innermost peripheral inner permanent magnet closest to the shaft, out of the inner permanent magnets, the wall facing the outside of the rotor, is smaller than a curvature of a central portion of an arc of a wall of the outermost peripheral permanent magnet or the inner permanent magnet, the wall facing the inside of the rotor, disposed further toward the rotor outside than the innermost peripheral inner permanent magnet.

3. The motor according to claim 2, wherein an arc of a central portion of the wall of the innermost peripheral inner permanent magnet, the wall facing the inside of the rotor, is substantially parallel to an arc of a central portion of a wall of the outermost peripheral permanent magnet or the inner permanent magnet, the wall facing the outside of the rotor, disposed further toward the rotor outside than the innermost peripheral inner permanent magnet.

4. The motor according to claim 1, wherein an arc angle of each of the outermost peripheral permanent magnet and the inner permanent magnets is greater than 90°.

5. The motor according to claim 1, wherein the thickness of the central portions of each of the inner permanent magnets is greater than or equal to 0.75 times the thickness of the central portion of the outermost peripheral permanent magnet.

6. The motor according to claim 1, wherein the thickness of the end portions of each of the inner permanent magnets is less than or equal to 1.3 times the thickness of the end portion of the outermost peripheral permanent magnet.

7. The motor according to claim 6, wherein the thickness of the end portions of each of the inner permanent magnets is greater than or equal to 1.2 times the thickness of the end portion of the outermost peripheral permanent magnet.

8. The motor according to claim 2, wherein the outermost peripheral permanent magnet or the inner permanent magnets are divided in a circumferential direction of the rotor.

9. The motor according to claim 1, wherein the inner permanent magnets are two layers.

\* \* \* \* \*